(12) United States Patent
Miyazaki et al.

(10) Patent No.: US 7,066,229 B2
(45) Date of Patent: Jun. 27, 2006

(54) PNEUMATIC TIRE

(75) Inventors: Shinichi Miyazaki, Kobe (JP); Kazumi Yamazaki, Kobe (JP); Osamu Toda, Kobe (JP); Yasuo Sakai, Itami (JP)

(73) Assignees: Sumitomo Rubber Industries, Ltd., Hyogo-ken (JP); Sumitomo Electric Industries, Ltd., Osaka-fu (JP)

( * ) Notice: Subject to any disclaimer, the term of this patent is extended or adjusted under 35 U.S.C. 154(b) by 90 days.

(21) Appl. No.: 10/619,628

(22) Filed: Jul. 16, 2003

(65) Prior Publication Data
US 2004/0060632 A1 Apr. 1, 2004

Related U.S. Application Data

(62) Division of application No. 09/783,988, filed on Feb. 16, 2001, now Pat. No. 6,612,354.

(30) Foreign Application Priority Data

| Feb. 17, 2000 | (JP) | ............................ 2000-039897 |
| Feb. 17, 2000 | (JP) | ............................ 2000-039899 |
| Mar. 2, 2000 | (JP) | ............................ 2000-057499 |

(51) Int. Cl.
*B60C 9/02* (2006.01)
*D02G 3/48* (2006.01)

(52) U.S. Cl. ...................... 152/556; 152/451; 152/548; 57/200; 57/902

(58) Field of Classification Search ................ 152/548, 152/451, 556; 57/902, 200, 236, 237
See application file for complete search history.

(56) References Cited

U.S. PATENT DOCUMENTS

| 4,268,573 A | 5/1981 | Baillievier |
| 5,472,033 A | 12/1995 | Kawamura et al. |
| 5,722,226 A | 3/1998 | Matsumaru |
| 5,772,809 A | 6/1998 | Yanagisawa |

FOREIGN PATENT DOCUMENTS

| EP | 0 551 124 A2 | 7/1993 |
| EP | 0 976 583 A2 | 2/2000 |
| JP | 09-228272 A | 9/1997 |
| JP | 2000-045789 A | 2/2000 |

*Primary Examiner*—Jeff H. Aftergut
*Assistant Examiner*—Justin Fischer
(74) *Attorney, Agent, or Firm*—Birch, Stewart, Kolasch & Birch, LLP

(57) ABSTRACT

A pneumatic tire comprises a cord-reinforced layer such as carcass, belt, bead reinforcing layer which is made of metallic cords, each metallic cord is made up of six to twelve metallic filaments whose diameter is in a range of from 0.15 to 0.45 mm, the metallic filaments include waved filaments and unwaved filaments, each waved filament is two-dimensionally waved at a wave pitch and wave height before twisted, the wave pitch is in a range of from 5.0 to 35.0 times the diameter of the filament, and the wave height is in a range of from 0.2 to 4.0 times the diameter of the filament, and the metallic filaments are twisted together into the cord at a twist pitch of from 10 to 40 mm so that the two-dimensionally waved filaments are each subjected to a certain rotation around its axial.

5 Claims, 6 Drawing Sheets

PNEUMATIC TIRE

This application is a divisional of U.S. patent application Ser. No. 09/783,988 having a filing date of Feb. 16, 2001, now U.S. Pat. No. 6,612,354.

The present invention relates to a pneumatic tire reinforced by metallic cords, more particularly to an improved metallic cord in which rubber penetration is improved without being increased in the cord diameter.

In the pneumatic tires especially radial tires for trucks, buses, light trucks and the like, steel cords are widely used as reinforcing cords for the carcass, belt, bead reinforcing layers and the like.

In recent years, in order to improve rubber penetration into such a steel cord, an invention was made, which is to use a waved filament in making a steel cord.

Generally, in the process of making a steel cord, as well known in the tire cord art, in order to prevent twisted filaments from loosing, the steel filaments are twisted together in a direction while giving each filament a rotation around its axis which rotation is reverse to the twist direction and the degree of the rotation is the same as the twist. In the finished cord, accordingly, each filament is not subjected to a rotation around its axis.

In such a conventional twisting method, if a waved filament is used, it is necessary to wave steel filaments largely in order to improve rubber penetration.

When steel filaments are waved largely, it is inevitable that the diameter of the finished cord increases and the initial elongation of the finished cord under light loads increases. As a result, the thickness and weight of cord-reinforced layers are increased and further the reinforcing effect tends to decrease.

It is an object of the present invention to provide a pneumatic tire with a cord-reinforced layer such as carcass, belt, bead reinforcing layer and the like of which metallic cords are improve in the rubber penetration without increasing the cord diameter.

According to the present invention, a pneumatic tire comprises a cord-reinforced layer made of metallic cords, each of the metallic cords being made up of six to twelve metallic filaments whose diameter (d) is in a range of from 0.15 to 0.45 mm, the six to twelve metallic filaments including waved filaments and unwaved filaments, each of the waved filaments being two-dimensionally waved at a wave pitch Pw and wave height (h) before twisted, the wave pitch Pw being in a range of from 5.0 to 35.0 times the diameter (d) of the filament, and the wave height (h) being in a range of from 0.2 to 4.0 times the diameter (d) of the filament, the metallic filaments being twisted together into the cord at a twist pitch Pc of from 10 to 40 mm so that the two-dimensionally waved filaments are each subjected to a certain rotation around its axial.

Therefore, until the cord is rubberized, the two-dimensionally waved filaments become unstable, and gaps which effectively work on rubber penetration can be formed between the filaments without increasing the thickness of the finished cord.

Embodiments of the present invention will now be described in detail in conjunction with the accompanying drawings.

Figure 6:
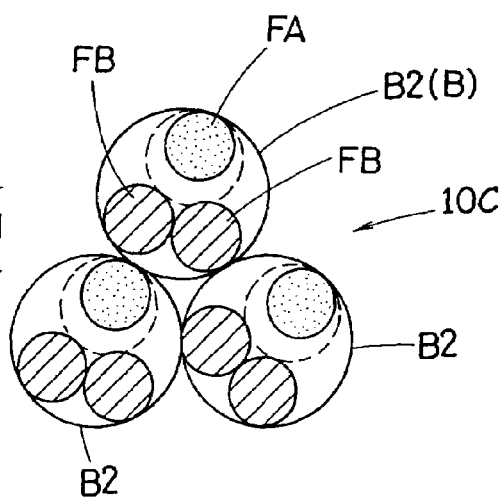
Figure 7:
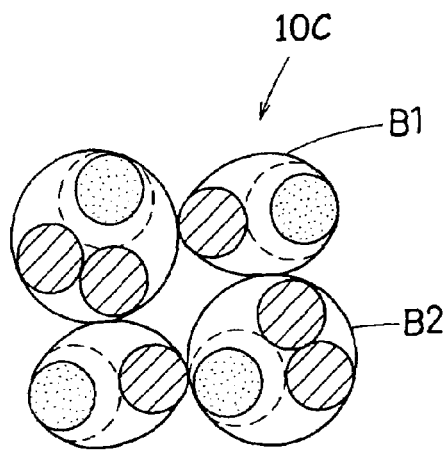
Figure 8:
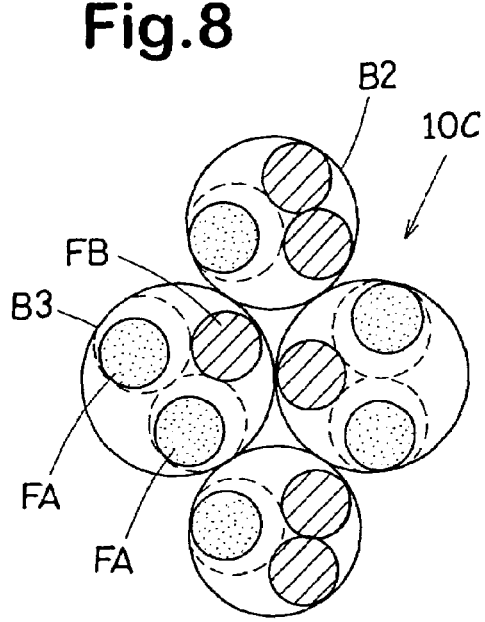

FIGS. 6, 7 and 8 each show another example of the filament arrangement of the carcass cord.

Figure 9:
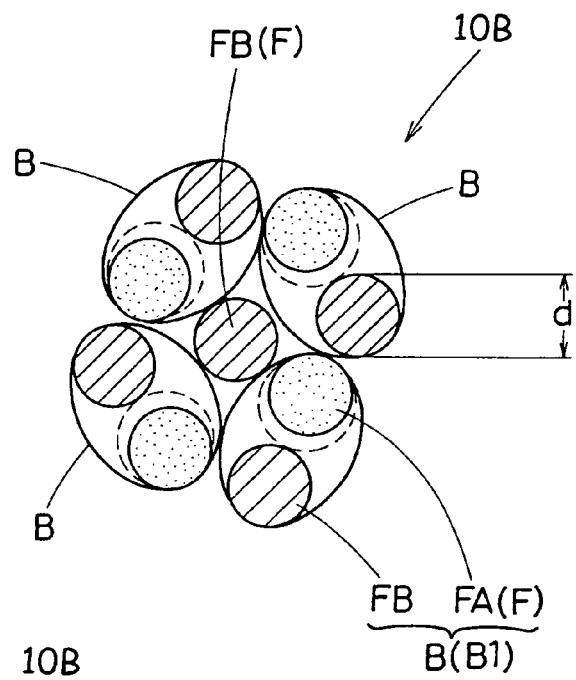

FIG. 9 is a schematic cross sectional view of an example of the belt cord showing an example of the filament arrangement.

Figure 10:
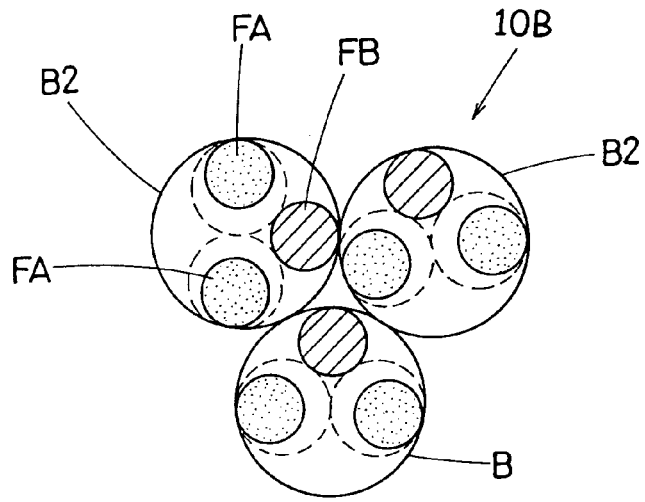
Figure 11:
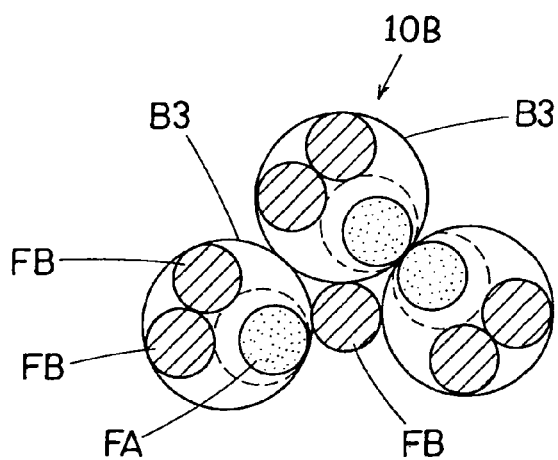

FIGS. 10 and 11 each show another example of the filament arrangement of the belt cord.

Figure 12:
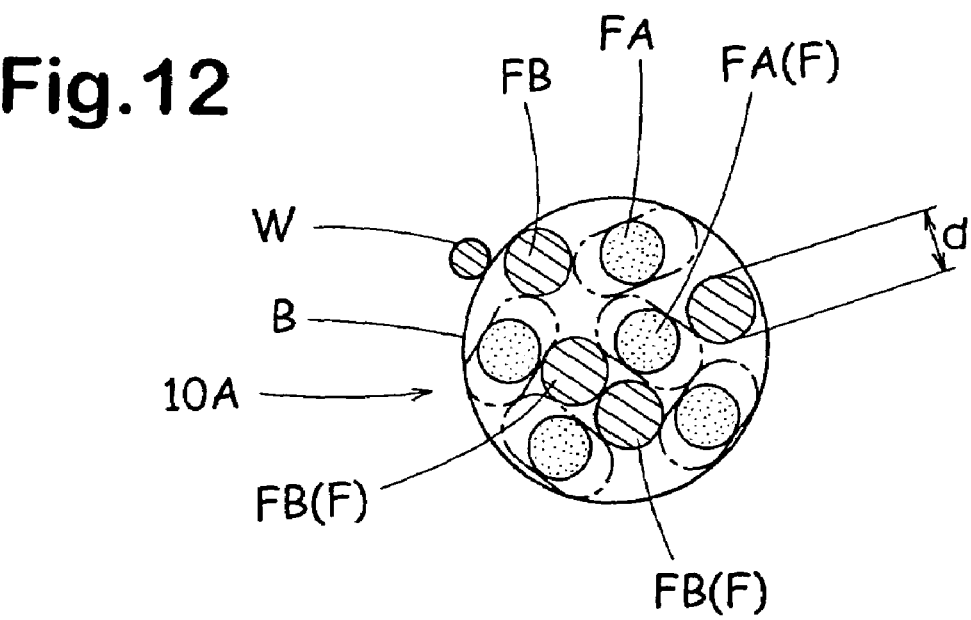
Figure 13:
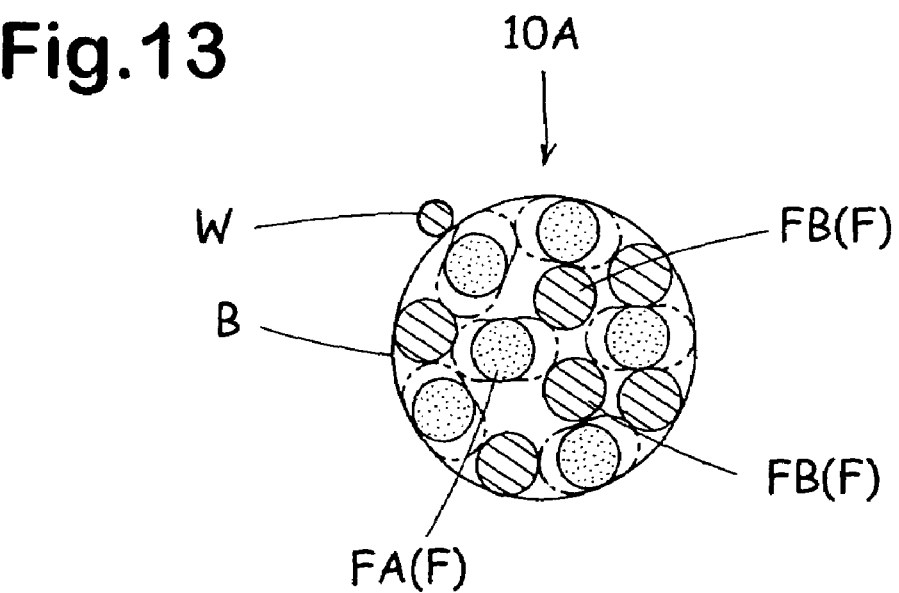

FIGS. 12 and 13 each show a schematic cross sectional view of an example of the belt cord showing an example of the filament arrangement.

Figure 14:
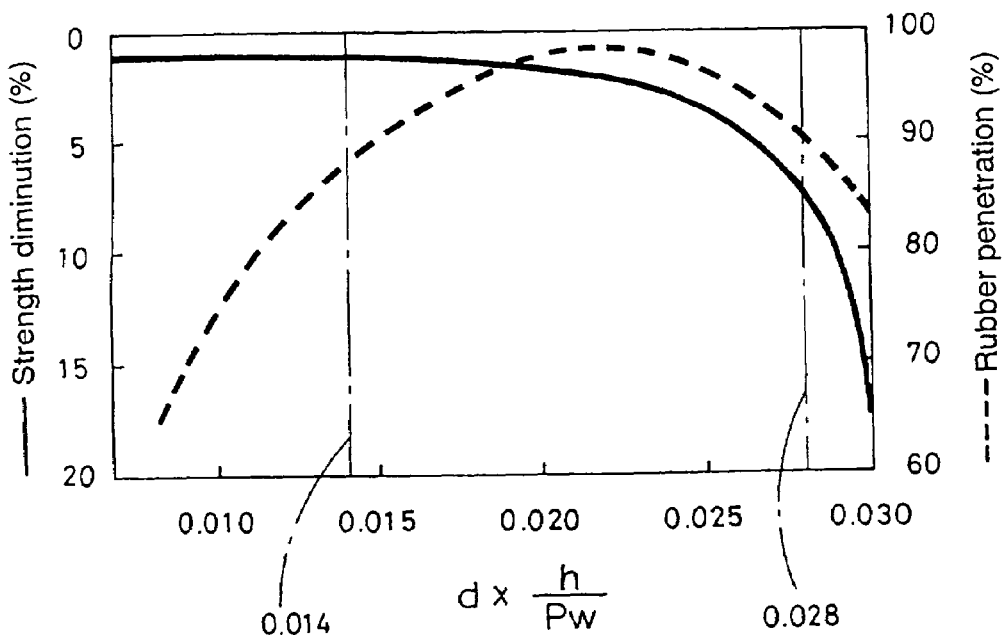

FIG. 14 is a graph showing the cord strength and rubber penetration as a function of a dXh/Pw value.

In the drawings, pneumatic radial tire 1 according to the present invention comprises a tread portion 2, a pair of sidewall portions 3 and a pair of bead portions 4 so as to form a toroidal shape, and the tire is provided with a carcass 6 extending between the bead portions 4, and a belt 7 disposed radially outside the carcass 6 in the tread portion 2.

The carcass 6 comprises at least one ply of cords arranged radially at an angle of from 70 to 90 degrees with respect to the tire equator and extending between the bead portions 4 through the tread portion 2 and sidewall portions 3 and turned up around the bead core 5 in each bead portion from the inside to the outside of the tire so as to form a pair of turnup portions 6b and a main portion 6a therebetween.

Between the main portion 6a and turnup portion 6b in each of the bead portion, there is disposed a rubber bead apex 8 extending radially outwards from the bead core 5 and tapering towards its radially outer end.

The belt 7 comprises at least two cross plies of parallel cords laid at an angle of from about 15 to about 65 degrees with respect to the tire equator. In case of heavy duty tires, the belt 7 is usually composed of three or four plies. In case of light truck tires, the belt 7 is usually composed of two or three plies. In case of passenger tires, the belt 7 is usually composed of two plies.

Heavy Duty Radial Tire

Figure 1:
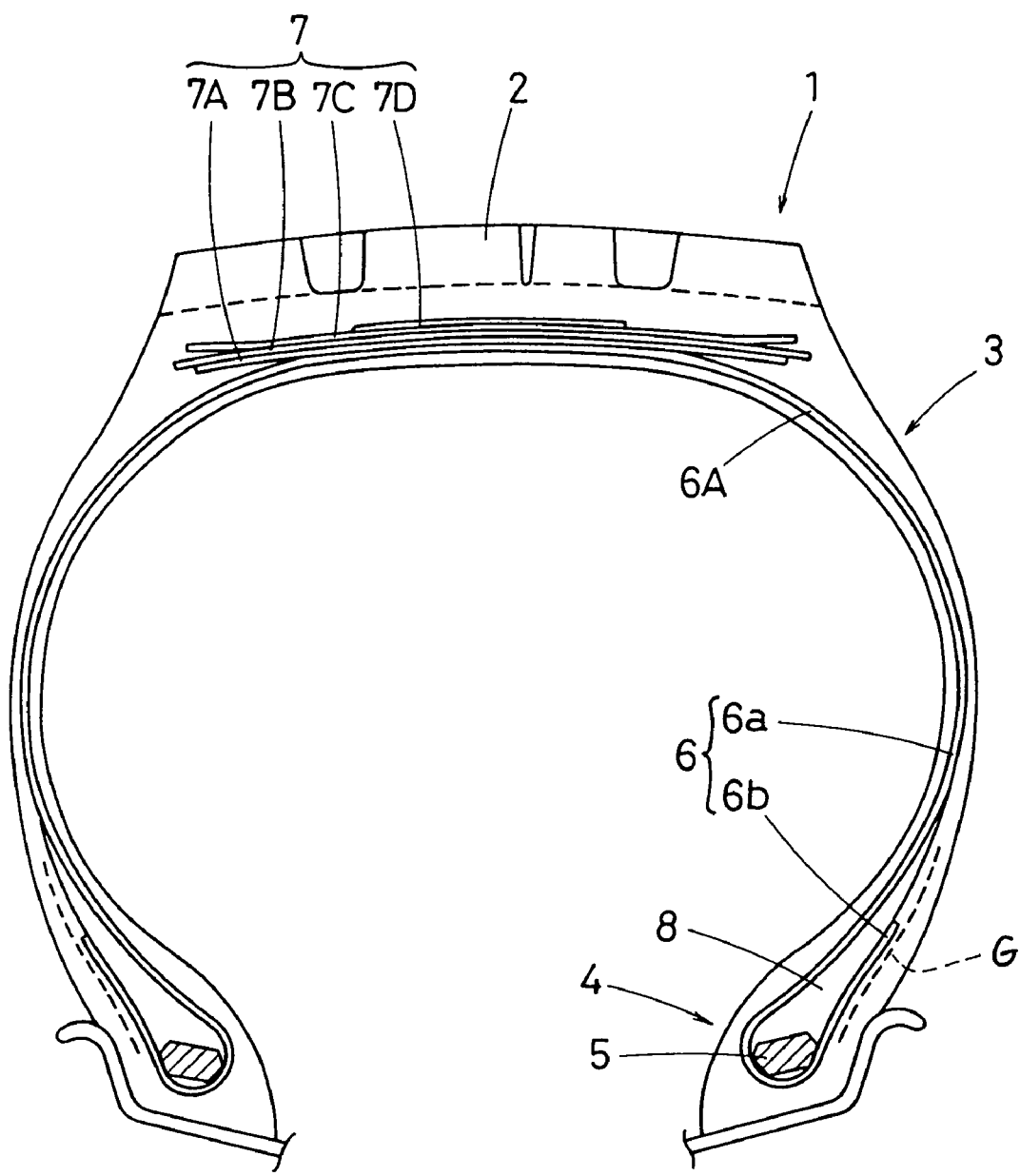
FIG. 1 is a cross sectional view of a tire according to the present invention.

FIG. 1 shows a heavy duty radial tire for trucks and buses as an embodiment of the present invention.

In this embodiment, each of the bead portion 4 is further provided with a bead reinforcing layer G. The bead reinforcing layer G in this example is disposed axially outside the carcass ply turnup portion 6b and made of rubberized metallic cords 10A laid crosswise to the adjacent carcass ply cords.

The carcass 6 in this embodiment is composed of a single ply 6A of metallic cords 10C arranged radially at about 90 degrees.

The belt 7 in this embodiment comprises a radially innermost ply 7A of rubberized parallel cords laid at an angle of from 35 to 65 degrees, and radially outer second, third and fourth plies 7B, 7C and 7D of rubberized parallel cords laid at an angle of from 15 to 35 degrees. In the above-mentioned four plies 7A to 7D, at least two middle plies 7B and 7C which are cross plies in this example are made of metallic cords 10. In this example, all the four plies are made of metallic cords 10B.

Carcass Cord

Figure 2:
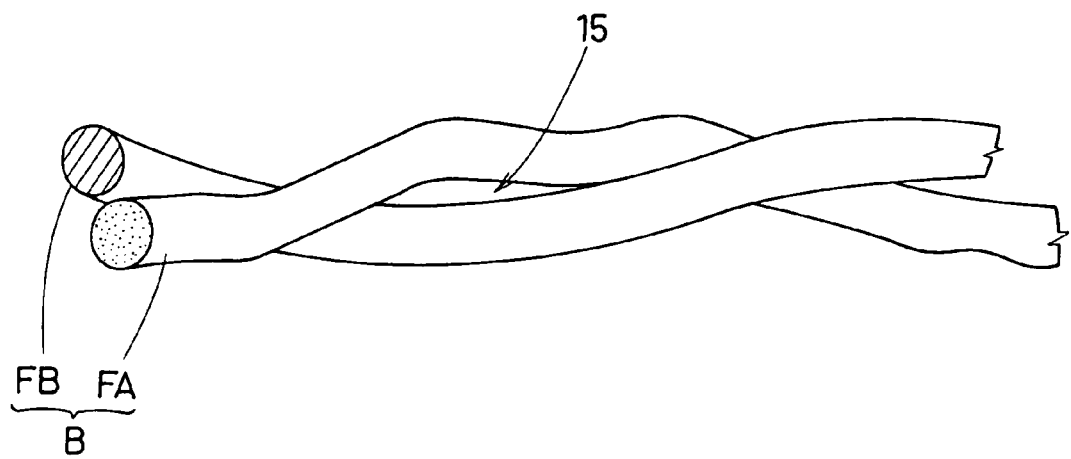
FIG. 2 is a schematic perspective view of a twisted bunch of a waved filament and unwaved filament.

The metallic cord 10C for the carcass 6 is composed of seven to twelve metallic filaments F whose diameter (d) is in a range of from 0.15 to 0.30 mm, wherein the metallic filaments F are grouped into (i) bunches B of two or three or four filaments or (ii) one filament F and bunches B of two or three or four filaments, and they are twisted together at a final twist pitch Pc of from 10 to 25 mm. The filaments F of each bunch B are twisted together into the bunch at a twist pitch Pf of from 3 to 20 times the final twist pitch Pc. Further, the bunches B each include at least one waved filament FA and at least one unwaved filament FB as shown in FIG. 2.

Hereinafter, each bunch and one filament F out of the bunches (in case (ii)) are generically called as "element".

Figure 3:
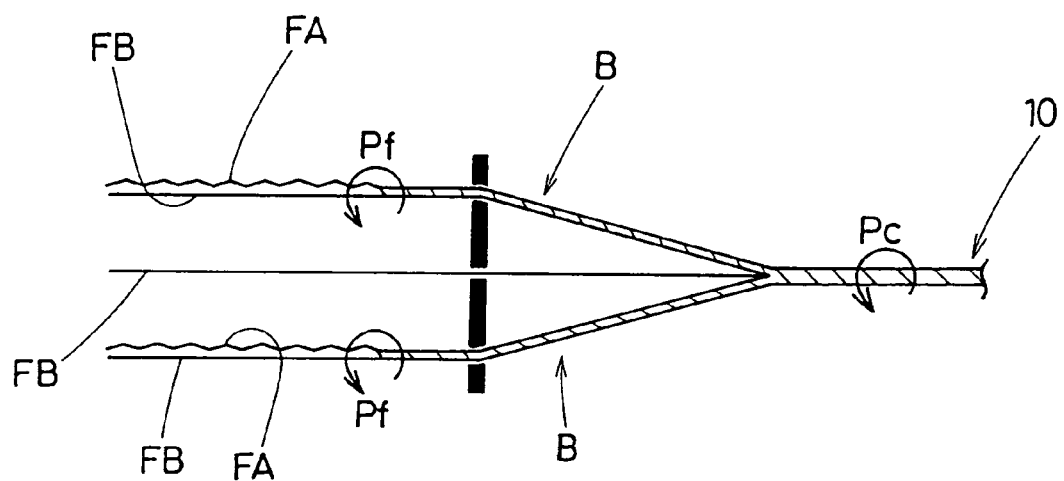
FIG. 3 is a diagram showing the twisting of a metallic cord.

FIG. 3 is a diagram showing the twisting of the cord. A single bunch of the "elements" is rotated around its axis. This corresponding to the final twist (pitch=Pc). By this rotation, each element is essentially subjected to a rotation around the axis of the element which is in the same direction and the same degree (Pc=Pf) as the above-mentioned rotation. In the metallic cord 10C, however, the degree of the rotation of each element especially bunch is decreased so that the twist pitch Pf becomes 3 to 20 times the twist pitch Pc. Thus, the direction of the first twist for the bunches B is the same as the direction of the final twist for the cord. As a result, in the finished cord, the filaments, especially waved filaments are each subjected to a rotation around its axis which is in the same direction as the final twist but the degree of rotation is less than the final twist. If the twist pitch Pf is less than 3 times or more than 20 times the final twist pitch Pc, the rubber penetration deteriorates.

Incidentally, as the direction of the rotation of the waved filament around its axis in the finished cord, it may be reversed as far as it concerned with the improvement in the rubber penetration.

Belt Cord

The metallic cord 10B for the belt 7 is composed of six to ten metallic filaments F whose diameter (d) is larger than the carcass cord 10C and in a range of from 0.25 to 0.45 mm, wherein similarly to the carcass cord, the metallic filaments F are grouped into (i) bunches B of two or three or four filaments or (ii) one filament F and bunches B of two or three or four filaments, and they are twisted together at a final twist pitch Pc which is in a range of from 10 to 40 mm but usually limited to a range of not more than that of the carcass cord. Further, the bunches B each include at least one waved filament FA and at least one unwaved filament FB. The filaments F of each bunch B are twisted together into the bunch at a twist pitch Pf of from 3 to 20 times the final twist pitch Pc.

The twisting in the belt cord 10B is made in the same way as the carcass cord 10C. Thus, the direction of the first twist for the bunches B is the same as the direction of the final twist for the cord. The rotation of the waved filaments in the finished cord is in the same direction as the final twist but the degree of rotation is less than the final twist.

Bead Reinforcing Cord

The metallic cord 10A for the bead reinforcing layer G is composed of seven to twelve metallic filaments F whose diameter (d) is in a range of from 0.17 to 0.25 mm.

The metallic filaments F include at least two waved filaments FA and at least three unwaved filaments FB. The three or more of unwaved filaments are necessary for decreasing the initial elongation of the cord under light loads.

The twist structure thereof is rather different from the carcass cord and belt cord as explained later.

Waved Filament

In the drawings, the cross section of the waved filament FA is dotted, and the cross section of the unwaved filament FB is hatched, for convenience sake, in order to distinguish from each other.

The waved filament FA is two-dimensionally waved at a wave pitch PW and a wave height (h) before being twisted.

Figure 4:
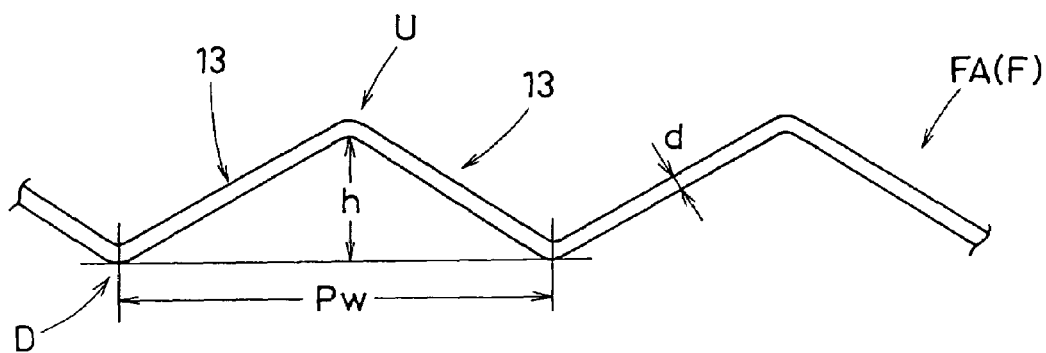
FIG. 4 is a schematic view of an example of the waved filament for explaining the wave pitch and height.

FIG. 4 shows an example of the waved filament FA, wherein the waveform is a triangular waveform made up of straight segments 13 of substantially the same length forming an obtuse angle therebetween. Also, a sawtooth waveform made up of alternate long straight segments and short straight segments and the like can be used. Further, A curved waveform devoid of straight segment such as sinusoidal waveform may be used. But, a waveform including straight segments 13 forming an obtuse angle therebetween is preferably used for the rubber penetration into the finished cord.

As shown in FIG. 4, the above-mentioned wave height (h) is defined as the peak-to-peak height of the wave, and the wave pitch Pw is defined as one cycle of the wave.

In case of carcass cord 10C and belt cord 10B, when the bunch B includes two or more waved filaments FA, it is preferable that the waved filaments FA include at least two kinds of waved filaments FA which are different from each other in respect of the wave pitch Pw. Thereby, the rubber penetration into the cord can be improved although the wave height (h) is relatively low. It may be possible to change the wave heights (h) between the different kinds of waved filaments FA. But, it is preferable not to largely change the wave heights (h), namely, the different kinds of waved filaments FA have substantially the same wave heights (h) in order to avoid an excessive decrease of the cord strength.

In case of bead reinforcing cord, however, it is preferable that all the waved filaments FA have the same wave pitch Pw and the same wave height (h). If the waved filaments have different wave pitches Pw and different wave heights (h), due to the twist structure mentioned later, a tensile stress concentrates on the shortest filament and the filament is liable to break because the filaments are very fine.

If the diameter (d) of the waved filament is less than 0.15 mm, the wave vanishes during twisting the waved filament and the rubber penetration can not be improved. Thus, the diameter of the waved filament should not be less than 0.15 mm.

Carcass Cord Examples

Figure 5:
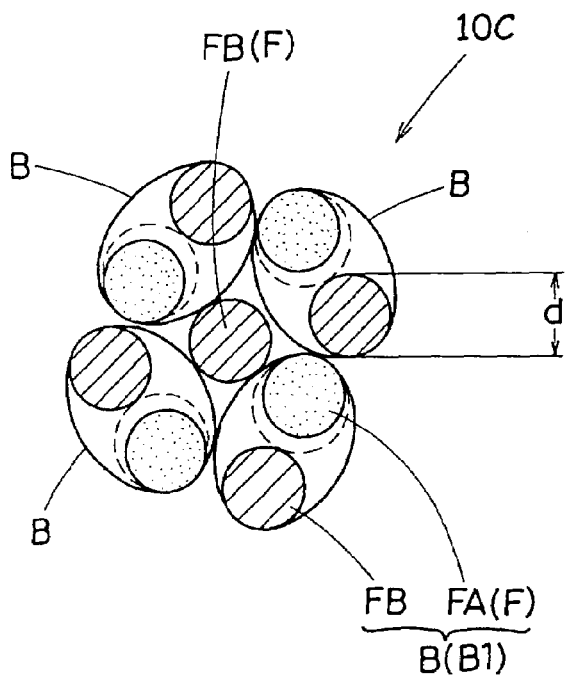
FIG. 5 is a schematic cross sectional view of an example of the carcass cord showing an example of the filament arrangement.

FIG. 5 shows an example of the carcass cord 10C made up of nine metallic filaments F which are grouped into four two-filament bunches B1 including one waved filament FA and one unwaved filament FB and the remaining one unwaved filament FB which are twisted together at the final twist pitch Pc.

FIGS. 6, 7 and 8 show other examples made up of nine, ten and twelve metallic filaments F, respectively.

In FIG. 6, three three-filament bunches B2 including one waved filament FA and two unwaved filaments FB are final twisted.

In FIG. 7, two two-filament bunches B1 and two three-filament bunches B2 are final twisted.

In FIG. 8, two three-filament bunches B2 including one waved filament FA and two unwaved filaments FB and two three-filament bunches B3 including two waved filaments FA and one unwaved filament FB are final twisted.

As shown in FIGS. 6–8, it is preferable that each bunch B is a two-filament bunch made up of two filaments F or a three-filament bunch made up of three filaments F.

It is important to the waved filament FA that the wave pitch Pw is set in a range of from 5.0 to 30.0 times, preferably 10.0 to 25.0 times the diameter (d), and the wave height (h) is set in a range of from 0.5 to 4.0 times the diameter (d).

Further, it is preferable to limit the value dXh/Pw within a range of from 0.014 to 0.028, more preferably 0.020 to 0.025.

In the heavy duty tires for trucks, buses and the like, as the carcass cords, steel cords having a 3+9 structure or 3+9+15 structure have been widely used. The above-mentioned metallic cords 10C were designed as a substitute for such conventional cords. If the diameter (d) is less than 0.15 mm, it becomes difficult to provide a strength necessitated by the carcass of a heavy duty tire. If the diameter (d) is more than 0.30 mm, it becomes difficult to provide flexibility necessitated by the carcass of a heavy duty tire.

If the wave pitch Pw is less than 5.0 times the diameter (d), the strength of the waved filament liable to decrease. If the wave pitch Pw is less than 30 times the diameter (d), the rubber penetration deteriorates.

If the wave height (h) is less than 0.5 times the diameter (d), the rubber penetration can not be improved. If the wave height (h) is more than 4.0 times the diameter (d), the strength of the waved filament is liable to decrease.

Belt Cord Examples

FIG. 9 shows an example of the belt cord 10B composed of nine metallic filaments F which are grouped into four two-filament bunches B1 of one waved filament FA and one unwaved filament FB and the remaining one unwaved filament FB which are twisted at the final twist pitch Pc.

FIGS. 10 and 11 show other examples composed of nine and ten metallic filaments F, respectively.

In FIG. 10, three three-filament bunches B2 of two waved filament FA and one unwaved filament FB are twisted.

In FIG. 11, three three-filament bunches B3 of one waved filament FA and two unwaved filament FB and the remaining one unwaved filament FB are twisted.

As shown in FIGS. 9–11, it is preferable that each bunch B is a two-filament bunch or three-filament bunch.

It is important to the waved filament FA that the wave pitch Pw is set in a range of from 5.0 to 30.0 times preferably 10.0 to 25.0 times the diameter (d), and the wave height (h) is set in a range of from 0.2 to 3.0 times preferably 0.5 to 2.0 times the diameter (d).

It is preferable to set the value dXh/Pw within a range of from 0.014 to 0.028, more preferably 0.020 to 0.025.

These cord structures can be applied to not only heavy duty tires but also light truck tires.

Hitherto, in the heavy duty tires for trucks, buses and the like, steel cords having a 3+6 structure (two filament diameters) or 2+7 structure (one filament diameter) have been widely used as belt cords. As a substitute for such conventional cords for heavy duty tires, it is preferable to set the diameter (d) in a range of from 0.30 to 0.45 mm.

On the other hand, in the light truck tires, steel cords having a 2+6 or 3+6 or 2+7 structures have been widely used as the belt cords. As a substitute for such conventional cords for light truck tires, it is preferable to set the diameter (d) in a range of from 0.25 to 0.35 mm.

If the diameter (d) is less than 0.25 mm, it becomes difficult to provide a strength necessitated by the belt. If the diameter (d) is more than 0.45 mm, it is difficult to prevent the belt rigidity from excessively increasing.

If the wave pitch Pw is less than 5.0 times the diameter (d), the strength of the waved filament liable to decrease. If the wave pitch Pw is less than 30 times the diameter (d), the rubber penetration deteriorates.

If the wave height (h) is less than 0.2 times the diameter (d), the rubber penetration can not be improved. If the wave height (h) is more than 3.0 times the diameter (d), the strength of the waved filament is liable to decrease.

In case of the belt cord 10B and the above-mentioned carcass cord 10C, it is preferable that the filament F out of the bunches B (case (ii)) is an unwaved filament FB.

Bead Reinforcing Cord Examples

FIGS. 12 and 13 show examples of the bead reinforcing cord 10A composed of nine and twelve filaments F, respectively.

In FIG. 12, five waved filaments FA and four unwaved filaments FB as a bunch are twisted into the cord while interchanging the positions of two filaments.

In FIG. 13, six waved filaments FA and six unwaved filaments FB as a bunch are twisted into the cord while interchanging the positions of two filaments.

Here, the meaning of the "interchanging the positions of two filaments" is as follows.

When a plurality of filaments, as a single bunch, are twisted, the relative positions of the filaments are substantially not changed along the longitudinal direction, and closed spaces are liable to be formed among the filaments. Such closed spaces can be broken by upsetting the positional balance of the filaments. In order to effectively upset the positional balance, the positions of two filaments are intentionally interchanged.

The "two filaments" may be specific two filaments, namely, "two filaments" are the same along the length of the cord. In this case, it can be said that the cord is formed by final-twisting the first-twisted "two filaments" and the remaining filaments.

It is however, preferable that the "two filaments" are changed along the longitudinal direction in a predetermined order so as not to concentrate the interchange on specific filaments. For example, provided that the cord is composed of filaments (a), (b), (c), (d), (e), (f) and (g), (a and b) are interchanged in a position, (c and d) are interchanged in a subsequent position, (e and f) are interchanged in a further subsequent position, (g and a), (b and c), (d and e)—continued. In this case, it may be said that any two filaments are partially twisted separately from the final twist for the cord.

Further, the meaning that "the filaments as a bunch are twisted into the cord" is as follows.

All the filaments are simply gathered as a single bunch, and the bunch is rotated around its axis. This rotation corresponding to the above-mentioned final-twist. Thus, in the finished cord, each filament is subjected to a rotation around its axis which is in the same direction and the same degree as the rotation of the bunch.

In such twist structure, the unity of the filaments F is less in comparison with the carcass cord 10C and belt cord 10B. Therefore, a wrapping wire is wound around the filaments F. The winding direction is reverse to the final-twist direction. The winding pitch is set in a range of from 3.0 to 7.0 mm. The diameter of the wrapping wire is set in a range of from 0.13 to 0.17 mm.

In the bead reinforcing cord, the waved filament FA is, before being twisted, two-dimensionally waved at wave pitch Pw and wave height (h) so as to be made up of straight segments 13. And all the waved filaments FA have the same wave height (h) and wave pitch Pw. The wave pitch Pw is set in a range of from 10.0 to 35.0 times the diameter (d). The wave height (h) is set in a range of from 0.5 to 4.0 times the diameter (d). The value dXh/Pw is set in a range of from 0.014 to 0.028, preferably 0.020 to 0.025.

Hitherto, in heavy duty tires for trucks, buses and the like, steel cords having a 3+9 or 3+9+15 structure have been widely used in such bead reinforcing layer. The above-mentioned metallic cord 10A was designed as a substitute for such conventional cords. If the diameter (d) is less than 0.17 mm, it is difficult to provide a rigidity necessitated by the bead reinforcing layer, and tire durability decreases. If the diameter (d) is more than 0.25 mm, the bead reinforcing layer loses flexibility and there is a possibility of separation failure if the bead portion undergoes excessively large deformation repeatedly.

If the twist pitch is less than 10 mm, as the initial elongation of the cord increases and it becomes difficult to use in the bead reinforcing layer. If the twist pitch is more than 30 mm, the cord becomes difficult to handle, and the form stability of the reinforcing layer decreases.

If the wave pitch Pw is less than 10.0 times the diameter (d), the strength of the waved filament liable to decrease. If the wave pitch Pw is less than 35 times the diameter (d), the rubber penetration deteriorates.

If the wave height (h) is less than 0.5 times the diameter (d), the rubber penetration can not be improved. If the wave height (h) is more than 4.0 times the diameter (d), the strength of the waved filament is liable to decrease.

Material of Metallic Filaments

As to the material of the filaments F and wrapping wire W of the above-mentioned cords 10A, 10B and 10C, hard drawn steel wires whose carbon content is 0.65 to 0.88 wt % are preferably used. If the carbon content is less than 0.65 wt %, the strength of the filament tends to be insufficient. If the carbon content is more than 0.88 wt %, the filament decreases in the bending strength.

Further, the metallic filaments F and wrapping wire W are preferably provided on the surface with a coat for improving the adhesion to the surrounding elastomer. For the coat, various resins, metal which acts during vulcanization and the like can be used.

In the above-mentioned examples of the carcass cord, belt cord and bead reinforcing cord, all the metallic filaments F in each cord have the same diameter (d).

Comparison Tests

Various experimental steel cords were made, and test tires were made using the cords. Then, the following comparison tests were conducted. The test results are shown in Tables 1, 2 and 3.

Test I

Test tires of size 11R22.5 for trucks and buses, having the same structure except for the carcass cords were made and tested as follows. The carcass was composed of a single ply of cords arranged radially at 90 degrees with respect to the tire equator and a cord count of 40/5 cm. The belt was composed of four plies of parallel steel cords having a 3+8+13×0.23 conventional structure laid at +65, +20, −20, −20 degrees and a cord count of 20/5 cm.

The test results are shown in Table 1.

Test II

Test tires of two sizes, 11R22.5 for trucks and buses and 205/60R17.5 for light trucks having the same structure except for the belt cords were made and tested as follows.

In case of 11R22.5 heavy duty tire, the carcass was composed of a single ply of steel cords having a 3+9×0.23 conventional structure arranged at 90 degrees and a cord count of 35/5 cm. The belt was composed of four plies of cords laid at +65, +20, −20 and −20 and a cord count of 20/5 cm.

In case of 205/60R17.5 light truck tire, the carcass was composed of two plies of polyester fiber cords having a 1670dtex/2 structure arranged at 88 degrees and a cord count of 50/5 cm. The belt was composed of two plies of cords laid at +18 and −18 degrees and a cord count of 35/5 cm.

The test results are shown in Table 2.

Test III

Test tires of size 11R22.5 for trucks and buses having the same structure except for the bead reinforcing cords were made and tested as follows.

The test results are shown in Table 3. In Table 3, item "Filament rotation", "S" means that each filament is subjected to a rotation in the same direction as the twist direction by the twisting. "N" means that each filament is not subjected to a rotation by the twisting because the filament is rotated in the counter direction during twisting.

Test methods and procedures are as follows.

Rubber Penetration Test

The cord was took out from the tire together with the surrounding topping rubber, and the topping rubber was carefully removed from the surface of the cord. Then, adjacent two filaments were took out therefrom along 10 cm long using a knife, and the length of a part surrounded by the two took-out filaments and the remaining filaments into which the rubber completely penetrated was measured to obtain the percentage of this length to the total length of 10 cm as the rubber penetration %. Such determination was made on ten positions per tire and the average thereof was adopted.

Corrosion and Reserved Strength Test

The tire was disassembled after running about 200,000 km, and the steel cords were checked for corrosion. The results are indicated by an index based on Ref.1 being 100. The smaller the index, the smaller the corrosion.

Further, the steel cords were took out and the cord strength was measured. The results are indicated in percentage to the original strength.

Bending Rigidity Test

The bending rigidity of the test cord was measured with a V-5 stiffness tester model 150-D of Taber Industries, U.S.A. as a force in gram centimeter required to bend the cord 15 degrees.

Shape Retention Test

The cord of 1,000 mm long was coiled into a loop of 200 mm diameter. The loop was collapsed gradually in fifteen seconds as follows: the loop was put on a horizontal plane; and one of two oppositely opposed points was fixed, and the other point is pressed towards the fixed point so that the two points contact each other. The collapsed state was maintained for ten seconds. Then, the pressing force was decreased gradually in fifteen seconds to allow the loop to return to its original shape. And the distance L between the two points was measured to obtain the shape retention rate $E=(L/200)\times100$. The shape retention rate E of each cord was divided by that of Ex.1 and converted into the reciprocal number and further multiplied by 100. The larger the value, the better the shape retention.

Cord Pull-Out Resistance Test

From the tire, a specimen of the bead reinforcing layer was cut out, and a force required to pull a cord 15 mm out of the specimen was measured.

Strength Diminution Test

Here, the cord strength is shown as a diminution in % of the strength of the test cord from that of a standard cord, wherein the standard cord for each test cord is a compact cord that is the same as the test cord in respect of the material, the number of the filaments, the filament diameter, and the final twist pitch, except that all the filaments are unwaved and the first twist pitch is the same as the final twist pitch. Thus, the smaller the value, the higher the strength.

From the test results, it was confirmed that although the cord diameter is decreased, rubber penetration, strength, initial elongation and the like can be improved.

Further, as shown in FIG. 14 which shows the strength diminution and rubber penetration as a function of the value of dXh/Pw, by setting the dXh/Pw value in a range of 0.014 to 0.028, both of the rubber penetration and the rate of diminution of the cord strength can be maintained in a good level.

The present invention can be suitably applied to not only heavy duty tires but also light truck tires, passenger car tires and the like.

TABLE 1

|  |  | Tire | | | | | | | |
|---|---|---|---|---|---|---|---|---|---|
|  |  | Ref.1 | Ref.2 | Ref.3 | Ref.4 | Ex.1 | Ex.2 | Ex.3 | Ex.4 |
|  | Cord structure | 1X9X0.20 | 1X9X0.20 | 1X9X0.20 | 1X9X0.20 | 1X9X0.20 | 1X9X0.20 | 1X9X0.20 | 1X12X0.15 |
|  | Carbon content (%) | 0.82 | 0.82 | 0.82 | 0.82 | 0.82 | 0.82 | 0.82 | 0.82 |
|  | Twist pitch Pc (mm) | 17 | 17 | 17 | 17 | 17 | 17 | 17 | 15 |
| Bunch 1 |  |  |  |  |  |  |  |  |  |
| Twist pitch Pf |  | 0 | 0 | 0 | 0 | 10XPc | 10XPc | 10XPc | 7XPc |
| No. of | Waved | 0 | 3(A;A;A) | 3(A;A;A) | 2(A;A) | 2(A;B) | 1(A) | 2(A;A) | 2(A;B) |
| filaments | Unwaved | 9 | 0 | 0 | 1 | 1 | 2 | 1 | 2 |
| Bunch 2 |  |  |  |  |  |  |  |  |  |
| Twist pitch Pf |  | 0 | 0 | 0 | 0 | 10XPc | 10XPc | 10XPc | 7XPc |
| No. of | Waved |  | 3(A;A;A) | 3(A;A;A) | 2(A;A) | 2(A;B) | 1(A) | 2(A;A) | 2(A;B) |
| filaments | Unwaved |  | 0 | 0 | 1 | 1 | 2 | 1 | 2 |
| Bunch 3 |  |  |  |  |  |  |  |  |  |
| Twist pitch Pf |  | 0 | 0 | 0 | 0 | 10XPc | 10XPc | 10XPc | 7XPc |
| No of | Waved |  | 3(A;A;A) | 3(A;A;A) | 2(A;A) | 2(A;B) | 1(A) | 2(A;A) | 2(A;B) |
| filaments | Unwaved |  | 0 | 0 | 1 | 1 | 2 | 1 | 2 |
|  | Wave |  | A | A | A | A;B | A | A | A;B |
|  | Pitch Pw (mm) |  | 10 | 5 | 10 | 5.0;3.0 | 5 | 4 | 2.0;4.0 |
|  | Height h (mm) |  | 0.5 | 1 | 1 | 0.45 | 0.5 | 0.5 | 0.4 |
| Cord characteristics |  |  |  |  |  |  |  |  |  |
|  | Cord diameter (mm) | 0.71 | 0.85 | 0.83 | 0.82 | 0.75 | 0.73 | 0.75 | 0.78 |
|  | Strength (N/sq. mm) | 3052 | 2980 | 2990 | 3000 | 3020 | 3030 | 3025 | 3010 |
|  | Strength diminution (%) | 0.2 | 2.2 | 2.3 | 2 | 1 | 1.2 | 1.2 | 2 |
|  | Elongation (%) @ 50N | 0.107 | 0.125 | 0.128 | 0.108 | 0.108 | 0.107 | 0.108 | 0.109 |
|  | Bending rigidity (gf · cm) | 23 | 20 | 20 | 21 | 21 | 22 | 21 | 20 |
|  | Rubber penetration (%) | 0 | 78 | 77 | 82 | 98 | 95 | 96 | 95 |
|  | Corrosion (index) | 100 | 55 | 53 | 45 | 11 | 20 | 18 | 25 |
|  | Reserved strength (index) | 88 | 92 | 93 | 95 | 92 | 95 | 93 | 91 |

TABLE 2

|  |  | Tire | | | | | | | | | |
|---|---|---|---|---|---|---|---|---|---|---|---|
|  |  | Ref.1 | Ref.2 | Ref.3 | Ref.4 | Ref.5 | Ex.1 | Ex.2 | Ex.3 | Ex.4 | Ex.5 |
|  |  | Tire size | | | | | | | | | |
|  |  | 11R22.5 | 11R22.5 | 11R22.5 | 11R22.5 | 205/60R17.5 | 11R22.5 | 11R22.5 | 11R22.5 | 205/60R17.5 | 205/60R17.5 |
| Cord structure |  | 1X9X0.38 | 1X9X0.38 | 1X9X0.38 | 1X9X0.38 | 1X9X0.30 | 1X9X0.38 | 1X9X0.38 | 1X9X0.38 | 1X9X0.30 | 1X7X0.25 |
| Carbon content (%) |  | 0.82 | 0.82 | 0.82 | 0.82 | 0.82 | 0.82 | 0.82 | 0.82 | 0.82 | 0.82 |
| Twist pitch Pc (mm) |  | 18 | 18 | 18 | 7 | 18 | 18 | 18 | 18 | 18 | 18 |
| Bunch 1 |  |  |  |  |  |  |  |  |  |  |  |
| Twist pitch Pf |  | 0 | 0 | 0 | 0 | 0 | 10XPc | 10XPc | 10XPc | 10XPc | 10XPc |
| No. of | Waved | 0 | 3(A;A;A) | 3(A;B;C) | 2(A;B) | 3(A;A;A) | 2(A;B) | 2(A;A) | 1(A) | 2(A;B) | 2(A;A) |
| filaments | Unwaved | 9 | 0 | 0 | 1 | 0 | 1 | 1 | 2 | 1 | 1 |
| Bunch 2 |  |  |  |  |  |  |  |  |  |  |  |
| Twist pitch Pf |  | 0 | 0 | 0 | 0 | 0 | 10XPc | 10XPc | 10XPc | 10XPc | 10XPc |
| No. of | Waved |  | 3(A;A;A) | 3(A;B;C) | 2(A;B) | 3(A;A;A) | 2(A;B) | 2(A;A) | 1(A) | 2(A;B) | 2(A;A) |
| filaments | Unwaved |  | 0 | 0 | 1 | 0 | 1 | 1 | 2 | 1 | 1 |
| Bunch 3 |  |  |  |  |  |  |  |  |  |  |  |
| Twist pitch Pf |  | 0 | 0 | 0 | 0 | 0 | 10XPc | 10XPc | 10XPc | 10XPc | 10XPc |
| No. of | Waved |  | 3(A;A;A) | 3(A;B;C) | 2(A;B) | 3(A;A;A) | 2(A;B) | 2(A;A) | 1(A) | 2(A;B) | 0 |
| filaments | Unwaved |  | 0 | 0 | 1 | 0 | 1 | 1 | 2 | 1 | 1 |
| Wave |  |  | A | A;B;C | A;B | A | A;B | A | A | A;B | A |
| Pitch Pw (mm) |  |  | 5 | 3.0;5.0;6.3 | 1.0;15 | 5 | 5.0;6.3 | 5 | 5 | 5.0;6.3 | 5 |
| Height h (mm) |  |  | 0.25 | 0.25;0.25;0.34 | 0.25 | 0.25 | 0.25;0.34 | 0.25 | 0.25 | 0.25;0.34 | 0.25 |

TABLE 2-continued

| | Tire | | | | | | | | | |
|---|---|---|---|---|---|---|---|---|---|---|
| | Ref.1 | Ref.2 | Ref.3 | Ref.4 | Ref.5 | Ex.1 | Ex.2 | Ex.3 | Ex.4 | Ex.5 |
| | Tire size | | | | | | | | | |
| | 11R22.5 | 11R22.5 | 11R22.5 | 11R22.5 | 205/60R17.5 | 11R22.5 | 11R22.5 | 11R22.5 | 205/60R17.5 | 205/60R17.5 |
| Cord characteristics | | | | | | | | | | |
| Cord diameter (mm) | 1.4 | 1.5 | 1.56 | 1.48 | 1.52 | 1.48 | 1.5 | 1.45 | 1.15 | 0.78 |
| Strength (N/sq. mm) | 3013 | 2980 | 2978 | 3000 | 2980 | 3021 | 3025 | 3030 | 3035 | 3009 |
| Strength diminution (%) | 0 | 2.9 | 3 | 2.5 | 2.9 | 2.5 | 2.5 | 2.2 | 2.6 | 2.7 |
| Elongation (%) @ 50N | 0.052 | 0.069 | 0.065 | 0.012 | 0.089 | 0.012 | 0.012 | 0.002 | 0.015 | 0.013 |
| Bending rigidity (gf · cm) | 260 | 220 | 215 | 232 | 91 | 232 | 231 | 235 | 96 | 28 |
| Rubber penetration (%) | 0 | 91 | 93 | 92 | 91 | 97 | 95 | 95 | 96 | 93 |
| Corrosion (index) | 100 | 86 | 89 | 90 | 86 | 8 | 10 | 15 | 9 | 13 |
| Reserved strength (index) | 86 | 96 | 96 | 95 | 95 | 95 | 95 | 9S | 93 | 93 |

TABLE 3

| | Tire | | | | | |
|---|---|---|---|---|---|---|
| | Ref.1 | Ref.2 | Ref.3 | Ref.4 | Ref.5 | Ref.6 |
| Cord structure | 1X7X0.23+1X0.15 | 1X7X0.23+1X0.15 | 1X7X0.23+1X0.15 | 1X9X0.20+1X0.15 | 1X9X0.20+1X0.15 | 1X9X0.20+1X0.15 |
| Carbon content (%) | 0.82 | 0.82 | 0.82 | 0.82 | 0.82 | 0.82 |
| Twist pitch (mm) | 15 | 15 | 15 | 18 | 18 | 18 |
| Filament rotation | N | N | S | N | N | S |
| No. of filaments  Waved | 0 | 3 | 7 | 0 | 3 | 9 |
| No. of filaments  Unwaved | 7 | 4 | 0 | 9 | 6 | 0 |
| Wave | | 2-D | 2-D | | 2-D | 2-D |
| Height h (mm) | | 0.1 | 0.3 | | 1.5 | 0.45 |
| Pitch Pw (mm) | | 2 | 3.3 | | 10 | 5 |
| dXh/Pw | | 0.012 | 0.021 | | 0.03 | 0.018 |
| Wrapping wire | | | | | | |
| Dia. (mm) | 0.15 | 0.15 | 0.15 | 0.15 | 0.15 | 0.15 |
| Winding pitch (mm) | 5 | 5 | 5 | 5 | 5 | 5 |
| Cord characteristics | | | | | | |
| Cord diameter (mm) | 0.7 | 0.82 | 0.8 | 1.1 | 1.23 | 1.19 |
| Strength (N/sq. mm) | 3010 | 2980 | 2930 | 3035 | 3010 | 2980 |
| Strength diminution (%) | 0 | 1.9 | 3.1 | 0 | 2.5 | 3.2 |
| Elongation (%) @ 50N | 0.118 | 0.12 | 0.148 | 0.119 | 0.121 | 0.152 |
| Bending rigidity (gf · cm) | 29 | 27 | 24 | 33 | 31 | 29 |
| Rubber penetration (%) | 0 | 91 | 95 | 0 | 92 | 94 |
| Corrosion (index) | 100 | 20 | 18 | 100 | 23 | 20 |
| Reserved strength (%) | 89 | 95 | 97 | 8S | 94 | 95 |
| Shape retention (index) | 95 | 99 | 101 | 9S | 100 | 101 |
| Pull-out resistance (N/15 mm) | 135 | 181 (broken) | 192 (broken) | 128 | 173 (broken) | 177 (broken) |

| | Tire | | | |
|---|---|---|---|---|
| | Ex.1 | Ex.2 | Ex.3 | Ex.4 |
| Cord structure | 1X7X0.23+1X0.15 | 1X7X0.23+1X0.15 | 1X9X0.20+1X0.15 | 1X9X0.20+1X0.15 |
| Carbon content (%) | 0.82 | 0.82 | 0.82 | 0.82 |
| Twist pitch (mm) | 15 | 15 | 18 | 18 |
| Filament rotation | S | S | S | S |
| No. of filaments  Waved | 3 | 4 | 3 | 5 |
| No. of filaments  Unwaved | 4 | 3 | 6 | 4 |
| Wave | 2-D | 2-D | 2-0 | 2-D |
| Height h (mm) | 0.3 | 0.45 | 0.45 | 0.5 |
| Pitch Pw (mm) | 3.3 | 4.5 | 5 | 0.45 |
| dXh/Pw | 0.021 | 0.023 | 0.018 | 0.022 |
| Wrapping wire | | | | |
| Dia. (mm) | 0.15 | 0.15 | 0.15 | 0.15 |
| Winding pitch (mm) | 5 | 5 | 5 | 5 |

TABLE 3-continued

| Cord characteristics | | | | |
|---|---|---|---|---|
| Cord diameter (mm) | 0.78 | 0.8 | 1.21 | 1.28 |
| Strength (N/sq. mm) | 2950 | 2920 | 3010 | 2980 |
| Strength diminution (%) | 2.1 | 2.8 | 2 | 2.7 |
| Elongation (%) @ 50N | 0.12 | 0.122 | 0.121 | 0.123 |
| Bending rigidity (gf · cm) | 28 | 27 | 31 | 30 |
| Rubber penetration (%) | 97 | 98 | 96 | 95 |
| Corrosion (index) | 11 | 15 | 12 | 14 |
| Reserved strength (%) | 96 | 97 | 95 | 97 |
| Shape retention (index) | 100 | 101 | 102 | 103 |
| Pull-out resistance (N/15 mm) | 191 (broken) | 195 (broken) | 181 (broken) | 185 (broken) |

The invention claimed is:

1. A pneumatic tire, comprising
a carcass extending between bead portions through a tread portion and sidewall portions,
said carcass comprising at least one ply of carcass cords extending between the bead portions,
each said carcass cord being made up of seven to twelve metallic filaments whose diameter is in a range of from 0.15 to 0.30 mm,
said seven to twelve metallic filaments being grouped into a plurality of elements, said plurality of elements being one filament and bunches of two or three or four filaments,
said plurality of elements being twisted at a twist pitch PC of from 10 to 25 mm, each bunch including at least one waved filament and at least one unwaved filament,
the filaments in each said bunch being twisted at a twist pitch Pf of from 3 to 20 times the twist pitch PC,
the waved filament being two-dimensionally waved at a wave pitch and wave height before being twisted, wherein the wave pitch is in a range of from 5.0 to 30.0 times the diameter of the filament, and the wave height is in a range of from 0.5 to 4.0 times the diameter of the filament.

2. The pneumatic tire according to claim 1, wherein each said bunch is made up of two or three filaments.

3. The pneumatic tire according to claim 1, wherein the bunch includes plural kinds of waved filaments having different wave pitches.

4. A pneumatic tire comprising
a carcass extending between bead portions through a tread portion and sidewall portions, and
a bead reinforcing layer disposed in each said bead portion,
said carcass comprising at least one ply of carcass cords extending between the bead portions, wherein:
each said carcass cord is made up of seven to twelve metallic filaments whose diameter is in a range of from 0.15 to 0.30 mm;
said seven to twelve metallic filaments are grouped into a plurality of elements, said plurality of elements being (i) bunches of two or three or four filaments, or (ii) one filament and bunches of two or three or four filaments;
said plurality of elements are twisted at a twist pitch PC of from 10 to 25 mm;
each bunch includes at least one waved filament and at least one unwaved filament; and
the waved filament is two-dimensionally waved at a wave pitch and wave height before being twisted, the wave pitch being in a range of from 5.0 to 30.0 times the diameter of the filament, and the wave height being in a range of from 0.5 to 4.0 times the diameter of the filament.
said bead reinforcing layer being made of bead reinforcing cords, wherein: each said bead reinforcing cord is made up of seven to twelve metallic filaments whose diameter is in a range of from 0.17 to 0.25 mm and a wrapping wire wound around the filaments and having a diameter in a range of from 0.13 to 0.17 mm;
said metallic filaments includes at least two waved filaments and at least three unwaved filaments;
the waved filament is two-dimensionally waved before twisted so as to be made up of straight segments in a zigzag formation;
all the waved filaments have the same wave pitch and the same wave height, the wave pitch being in a range of from 10.0 to 35.0 times the diameter of the filament, and the wave height being in a range of from 0.5 to 4.0 times the diameter of the filament, and the valve dXh/Pw is in a range of from 0.014to 0.028.
said seven to twelve metallic filaments are twisted at a twist pitch of from 10 to 30 while interchanging at least two of said seven to twelve metallic filaments in their relative position; and
the wrapping wire is wound around the twisted filaments in a direction reverse to said twist direction at a winding pitch of 3.0 to 7.0 mm.

5. The pneumatic tire according to claim 4, wherein the filaments in each said bunch are twisted at a twist pitch Pf of from 3 to 20 times the twist pitch Pc.

* * * * *